US008757929B2

(12) United States Patent
Gutierrez et al.

(10) Patent No.: US 8,757,929 B2
(45) Date of Patent: Jun. 24, 2014

(54) APPARATUS AND METHODS FOR CONNECTING HOSES SUBSEA

(75) Inventors: Luis Javier Gutierrez, Houston, TX (US); John Douglas Hughes, Katy, TX (US); Stuart Douglas Partridge, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 0 days.

(21) Appl. No.: 13/454,644

(22) Filed: Apr. 24, 2012

(65) Prior Publication Data

US 2013/0011201 A1    Jan. 10, 2013

Related U.S. Application Data

(60) Provisional application No. 61/479,489, filed on Apr. 27, 2011.

(51) Int. Cl.
*F16L 1/26* (2006.01)
*F16L 33/23* (2006.01)

(52) U.S. Cl.
CPC .. *F16L 1/26* (2013.01); *F16L 33/23* (2013.01)
USPC ...... 405/170; 405/184.1; 285/242; 29/402.08

(58) Field of Classification Search
USPC ........ 405/154.1, 158, 169, 170, 184.1, 184.4; 285/242, 256; 29/402.01, 402.03, 29/402.06, 402.08, 402.09, 402.11, 29/402.12, 402.14, 402.19
See application file for complete search history.

(56) References Cited

U.S. PATENT DOCUMENTS

| 654,040 | A | | 6/1867 | Silvester | |
|---|---|---|---|---|---|
| 466,255 | A | | 12/1891 | Paul | |
| 576,119 | A | | 2/1897 | Hess | |
| 3,393,926 | A | * | 7/1968 | Arnold | 285/18 |
| 3,635,504 | A | | 1/1972 | Borden et al. | |
| 3,670,374 | A | | 6/1972 | Hayes, Jr. | |
| 4,437,791 | A | | 3/1984 | Reynolds | |
| 4,572,549 | A | * | 2/1986 | Sidwell | 285/39 |
| 4,878,783 | A | * | 11/1989 | Baugh | 405/169 |
| 5,456,501 | A | * | 10/1995 | Reaux | 405/169 |
| 5,542,776 | A | | 8/1996 | Reynolds | |
| 5,865,476 | A | * | 2/1999 | Kramer | 285/242 |
| 6,543,965 | B2 | * | 4/2003 | Toth et al. | 405/169 |
| 2002/0043802 | A1 | * | 4/2002 | Koster | 285/242 |
| 2006/0130287 | A1 | | 6/2006 | Weinhold | |

(Continued)

FOREIGN PATENT DOCUMENTS

WO    WO 2004/059203    7/2004

*Primary Examiner* — Frederick L Lagman
(74) *Attorney, Agent, or Firm* — Jayne C. Piana

(57) ABSTRACT

A hose splicing system comprises a first clamping tool and a hose fitting adapter. The first clamping tool includes a first clamp member and a second clamp member. An inner surface of at least one of the first clamp member and the second clamp member includes a recess configured to receive an end of a hose. In addition, the first clamping tool includes a hinge coupled to the second clamp member. Further, the first clamping tool includes a lock member pivotally coupled to the first clamp member. The hose fitting adapter has a central axis, a first end configured to be inserted into the end of the hose, a second end configured to releasably connect to a rigid hose end connector, and a through bore extending axially from the first end to the second end.

31 Claims, 8 Drawing Sheets

(56) References Cited

U.S. PATENT DOCUMENTS

| | | | |
|---|---|---|---|
| 2008/0221469 A1* | 9/2008 | Shevchuk | 285/242 |
| 2011/0304136 A1 | 12/2011 | Webster et al. | |
| 2012/0319396 A1* | 12/2012 | Slocum et al. | 285/39 |
| 2012/0328371 A1* | 12/2012 | Munstereifel et al. | 405/169 |

\* cited by examiner

APPARATUS AND METHODS FOR CONNECTING HOSES SUBSEA

CROSS-REFERENCE TO RELATED APPLICATIONS

This application claims benefit of U.S. provisional patent application Ser. No. 61/479,489 filed Apr. 27, 2011, and entitled "Apparatus and Methods for Splicing Conduit Subsea," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to apparatus and methods for connecting hoses and other fluid conduits. More particularly, the invention relates to apparatus and methods for splicing hoses and conduits in a subsea marine environment.

2. Background of the Technology

Hydraulically operated systems are deployed subsea to facilitate and support offshore drilling and production operations. The hydraulically operated system is often connected to a subsea hydraulic power source with a flexible hose that supplies hydraulic fluid pressure to operate the system. In some cases, it may be necessary to cut the hydraulic fluid supply hose to replace or repair the hydraulic power source or hydraulically operated system, and then reconnect the repaired or new power source with the hydraulic system. For example, referring now to FIGS. 1A-1C, upon failure of a subsea hydraulic power source 10, it is disconnected from a subsea hydraulically operated system 20 by cutting the hydraulic supply hose 30 extending therebetween. Cutting hose 30 results in a first hose segment 30a connected to system 20 and a second hose segment 30b connected to power source 10. Next, the non-functional power source 10 is retrieved to the surface for repair or replacement.

A repaired or new hydraulic power source 10' is then lowered subsea and reconnected to system 20 subsea using one or more remotely operated vehicles (ROVs). As best shown in FIGS. 1B and 1C, typically, the subsea ROVs remove hose segment 30a coupled to system 20 by disconnecting a connector 31 that couples hose segment 30a to system 20. Next, a replacement hose segment 30a' having a connector 31' at one end and a standard ROV male connector 32 at the opposite end is connected to system 20. The repaired or new hydraulic power source 10' is deployed with a hose segment 30b' with a standard ROV female connector 33 that releasably connects to connector 32, thereby fluidly coupling power source 10' to system 20.

This process enables repair or replacement of subsea hydraulic power source 10 without retrieving system 20 to the surface. However, before hose segments 30a', 30b' can be connected, hose segment 30a is removed and a new hose segment 30a' is connected to system 20. Accordingly, this process is often time consuming and challenging to perform with ROVs, particularly in deepwater environments.

An alternative approach to connect two hose segments subsea (e.g., connect hose segments extending from a subsea hydraulic power source and a subsea hydraulic system) is to splice the hose segments together. Referring now to FIG. 2, a hose splicing or insertion tool 40 was developed by Oceaneering, Inc. of Houston, Tex. to connect severed hoses in an emergency situation. Tool 40 includes a conical hollow needle 41 and a cylindrical body 42 coupled to needle 41. A paddle 43 extends from body 42 and is turned by a subsea ROV to engage seals inside body 42. Paddle 43 and a pair of arms 44a, 44b extending from body 42 allow an ROV operator to stab needle 41 into a first hose segment. Body 42 includes a connector 45 that allows connection of a second hose segment to tool 40. Fluid communication between the two hose segments connected to tool 40 is provided through connector 45, body 42, and needle 41. Fluid flow through tool 40 may be monitored with a pressure gauge 46 coupled to connector 45. However, the flow area through the needle is substantially less than that of the original hose, so the connection acts as a flow restrictor, thereby reducing the effectiveness of the spliced line. In addition, it is very difficult for an ROV operator to align the needle with the end of the hose and push the needle into the hose.

Accordingly, there remains a need in the art for apparatus and methods to repair and/or install subsea devices and systems that rely on hose or other conduit connections, establish ad hoc subsea hose connections, and repair damaged or severed subsea hoses. Such apparatus and methods would be particularly well-received if they were easily manipulated, installed, and visualized by one or more subsea ROVs; easily deployed from a surface vessel; and were capable of maintaining fluid flow rates and pressures substantially the same as the original subsea hose or conduit.

BRIEF SUMMARY OF THE DISCLOSURE

These and other needs in the art are addressed in one embodiment by a hose splicing system. In an embodiment, the system comprises a first clamping tool. The first clamping tool includes a first clamp member and a second clamp member. Each clamp member has a first end and a second end opposite the first end. The first clamp member has an inner surface opposed to an inner surface of the second clamp member, wherein the inner surface of at least one of the first clamp member and the second clamp member includes a recess configured to receive an end of a hose. In addition, the first clamping tool includes a handle coupled to the first clamp member or the second clamp member and configured to be grasped by a subsea vehicle to manipulate the first clamping tool. Further, the first clamping tool includes a hinge coupled to the first end of the first clamp member and the first end of the second clamp member. Still further, the first clamping tool includes a lock member pivotally coupled to the second end of the first clamp member. The system also comprises a hose fitting adapter having a central axis, a first end, a second end opposite the first end, and a through bore extending axially from the first end to the second end. The first end of the hose fitting adapter is configured to be inserted into the end of the hose and the second end of the hose fitting adapter comprises a connector configured to releasably connect to a rigid hose end connector.

These and other needs in the art are addressed in another embodiment by a system for connecting a first hose segment to a second hose segment. In an embodiment, the system comprises a hose fitting adapter having a central axis, a first end, a second end opposite the first end, and a through bore extending axially from the first end to the second end. The hose fitting adapter includes a connector at the first end, a stabbing member extending axially from the second end, an annular locking lip axially positioned between the stabbing member and the second end, and a locking region axially positioned between the locking lip and the second end. The stabbing member is disposed within an end of the first hose segment. The connector of the hose fitting adapter is configured to connect with a rigid hose connector disposed at an end of the second hose segment. In addition, the system comprises a first clamping tool disposed about the end of the first hose segment. The first clamping tool includes a first clamp member and a second clamp member. Each clamp member has a first end, a second end opposite the first end, and a pair of lateral sides extending between the first end and the second end. The end of the first hose segment is disposed in a cavity between the first clamp member and the second clamp member. The first clamping tool also includes a hinge coupled to the first end of the first clamp member and the first end of the second clamp member. Further, the first clamping tool first includes a lock member pivotally coupled to the second end of the first clamp member. The lock member compresses the first clamp member against the second clamp member. Still further, the first clamping tool includes a first locking plate coupled to one of the lateral sides of the first clamp member and a second locking plate coupled to one of the lateral sides of the second clamp member. The first locking plate and the second locking plate are disposed about the locking region and axially abut the locking lip.

These and other needs in the art are addressed in another embodiment by a method for replacing a first subsea hydraulic power source connected to a subsea hydraulic system with a hydraulic hose. In an embodiment, the method comprises (a) cutting the hydraulic hose into a first hose segment connected to the first subsea hydraulic power source and a second hose segment connected to the hydraulic system. In addition, the method comprises (b) deploying a second hydraulic power source subsea, wherein a third hose segment is connected to the second hydraulic power source and has a distal end coupled to a hose fitting adapter. Further, the method comprises (c) inserting a stabbing member of the hose fitting adapter into an open end of the second hose segment using an underwater vehicle. Still further, the method comprises (d) closing a clamping tool around the open end of the second hose segment and the stabbing member disposed within the open end of the second hose segment after (c). Moreover, the method comprises (e) locking the clamping tool onto the open end of the second hose segment after (d). The method also comprises (f) compressing the open end of the second hose segment between the stabbing member and the clamping tool during (e).

These and other needs in the art are addressed in another embodiment by a method of establishing an ad hoc hydraulic power connection to a subsea hydraulic system. In an embodiment, the method comprises (a) cutting a hydraulic hose extending between a first subsea hydraulic power source and the subsea hydraulic system. In addition, the method comprises (b) deploying a second hydraulic power source subsea, the second hydraulic power source fluidly connected to an assembly including a hot stab fluidly coupled to a hose fitting adapter. Further, the method comprises (c) inserting a stabbing member of the hose fitting adapter into an open end of the hydraulic hose connected to the hydraulic system using an underwater vehicle. Still further, the method comprises (d) securing the stabbing member within the open end of the hydraulic hose with a clamping tool disposed about the open end and the stabbing member after (c).

Embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1A:
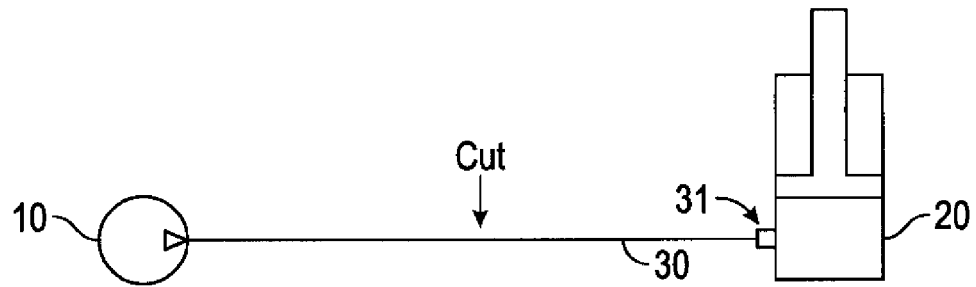
FIGS. 1A-1C are sequential schematic illustrations of a conventional method for reconnecting hose segments of a subsea hydraulic power source and a subsea hydraulic system.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 3:
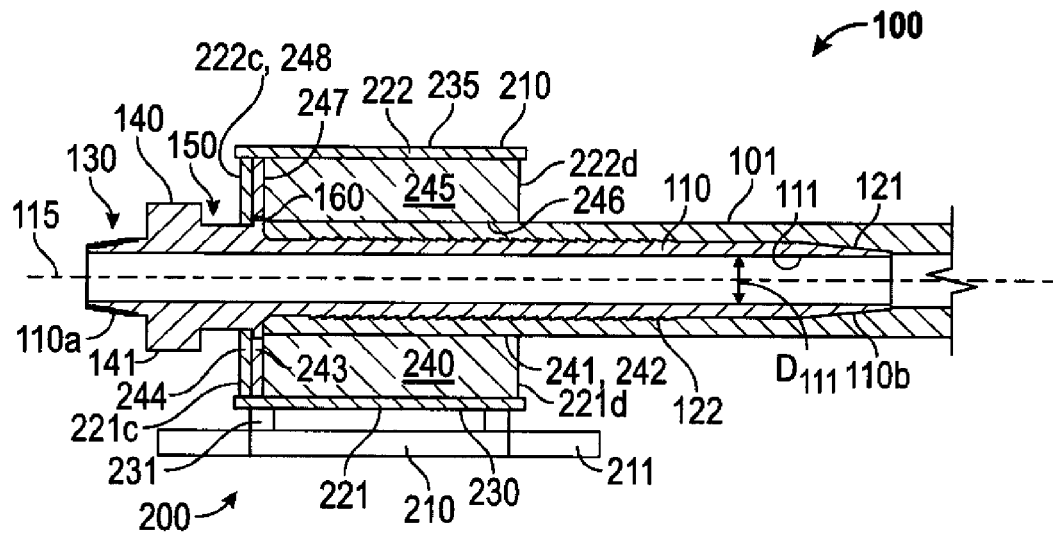
FIG. 3 is a cross-sectional view of an embodiment of a system in accordance with the principles described herein for facilitating the connection of two subsea hose segments.

Referring now to FIG. 3, a system 100 to facilitate the connection of two subsea hoses or hose segments is shown. In this embodiment, system 100 includes a hose fitting adapter 110 and a clamping tool 200. Adapter 110 is at least partially disposed in the end of a hose segment 101 and clamping tool 200 is disposed about, closed, and locked onto the end of hose segment 101 and adapter 110 disposed therein. In particular, hose segment 101 is compressed between clamping tool 200 and adapter 110 to restrict and/or prevent the end of hose segment 101 from moving relative to or disengaging clamping tool 200 and adapter 110. As will be described in more detail below, the end of a second hose segment (not shown) is connected to adapter 110 to splice hose segment 101 to the second hose segment and allow fluid communication therebetween.

Figure 4:
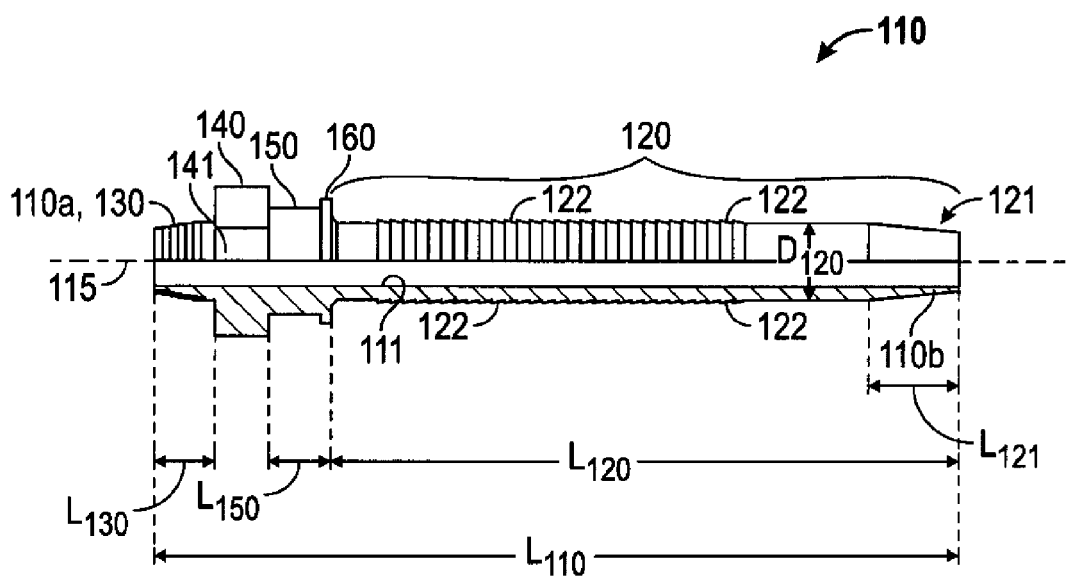
FIG. 4 is a partial cross-sectional view of the hose fitting adapter of FIG. 3.

Referring now to FIGS. 3 and 4, hose fitting adapter 110 has a central or longitudinal axis 115, a first end 110a, a second end 110b opposite first end, and a cylindrical through passage or bore 111 extending axially between ends 110a, 110b. Adapter 110 has an axial length $L_{110}$ and an inner diameter $D_{111}$. In general, length $L_{110}$ and diameter $D_{111}$ can be varied as desired based on a variety of factors including, without limitation, the size and diameter of the hose segments being connected, the anticipated fluid pressures and flow rates in the spliced connection, etc. However, for most subsea applications, length $L_{110}$ is preferably 6.0 to 20.0 inches (~15 to 50 cm), and more preferably 8.0 to 12.0 inches (~20 to 30 cm); and diameter $D_{111}$ is preferably 0.5 to 6.0 inches (~1.3 to 15 cm). Further, diameter $D_{111}$ is preferably the same or substantially the same as the internal diameter of the hose segment within which it is disposed (e.g., hose segment 101) so as not to interfere with the flow rate or pressure of the fluid flowing therethrough.

In this embodiment, adapter 110 includes a stabbing member 120 extending axially from end 110b, a standard threaded hose connector or fitting 130 at end 110a, a gripping profile 140 axially adjacent connector 130, a clamp locking region 150 axially adjacent profile 140, and an annular locking lip 160 axially positioned between stabbing member 120 and locking region 150. As best shown in FIG. 3, during subsea splicing operations, stabbing member 120 is disposed in the end of hose segment 101 and the remainder of adapter 110 extends from hose segment 101 with lip 160 axially abutting the end face of hose segment 101.

Referring again to FIGS. 3 and 4, stabbing member 120 has an axial length $L_{120}$ and an outer diameter $D_{120}$. In general, length $L_{120}$ and diameter $D_{120}$ can be varied as desired based on a variety of factors including, without limitation, the size and diameter of the hose segments being connected, the anticipated fluid pressures and flow rates in the spliced connection, the number of clamping tools (e.g., tools 200) employed, etc. For example, for use with a 1.5 in. inner diameter hose segment and two clamping tools 200, length $L_{120}$ is preferably between 8.0 in. and 14 in. In some embodiments, outer diameter $D_{120}$ is about 5 to 10% larger than inner diameter $D_{111}$. In addition, stabbing member 120 includes a frustoconical tapered region 121 at end 110b and a plurality of friction elements 122 axially disposed between tapered region 121 and lip 160. Tapered region 121 has a 5° taper relative to axis 115 and an axial length $L_{121}$ measured from end 110b. Outer diameter $D_{120}$ of stabbing member 120 decreases moving axially along tapered region 121 toward end 110b, thereby facilitating the insertion and axial advancement of end 110b into hose segment 101.

Friction elements 122 are disposed along the outer surface of stabbing member 120 and are configured to engage and grip the inner surface of hose segment 101 to restrict and/or prevent adapter 110 from being pulled axially from the end of hose segment 101 once it is properly seated therein. Friction elements 122 preferably cover 10 to 70% of the outer surface area of stabbing member 120, and more preferably cover about 20 to 60% of the outer surface area of stabbing member 120. In this embodiment, the plurality of friction elements 122 are axially centered along stabbing member 120.

In this embodiment, friction elements 122 comprise a plurality of annular ridges uniformly axially spaced along stabbing member 122. However, in other embodiments, the friction elements (e.g., friction elements 122) may comprise other suitable structures (e.g., a roughened or knurled surface), ribs, nodules, nodes, knots, knobs, lumps, bumps, and protuberances. Moreover, in general, the friction elements may be randomly or uniformly spaced about the stabbing member (e.g., stabbing member 120). In this embodiment, friction elements 122 are integral with stabbing member 120 (i.e., friction elements 122 and stabbing member 120 are monolithically formed as a unitary single-piece), and thus, are made of the same material. However, in other embodiments, the friction elements may not be integral with the stabbing member and/or may be made from a different material than the stabbing member. For example, the stabbing member may be made of a rigid material such as steel or titanium, while the friction elements are made of a more flexible material such as natural or synthetic rubber, elastomer, or a polymeric material.

Hose connector 130 is disposed at end 110a and has an axial length $L_{130}$ measured from end 110a. Length $L_{130}$ is preferably about 2 to 20%, and more preferably about 2 to 10%, of length $L_{110}$ of adapter 110. Connector 130 allows end 110a of adapter 110 to be threadably connected to a mating connector or fitting on an end of a second hose segment to allow fluid communication therebetween.

Referring still to FIGS. 3 and 4, gripping profile 140 includes a plurality of circumferentially adjacent planar surfaces 141 that are positively engaged and gripped by an ROV or other device moving to apply rotational torque to adapter 110 when connecting connector 130 to a mating fitting or connector. For example, profile 140 may be used to rotate adapter 110 about axis 115 or prevent adapter 110 from rotating about axis 115. In this embodiment, gripping profile 140 is a hexagonal profile, however, in other embodiments, the gripping profile may have other suitable geometries such as rectangular, octagonal, etc.

Clamp locking region 150 extends axially from profile 140 to lip 160 and is radially recessed relative to profile 140 and lip 160. In this embodiment, locking region 150 comprises a cylindrical outer surface on adapter 110. Clamp locking region 150 has an axial length $L_{150}$ measured between profile 140 and lip 160. In general, length $L_{150}$ can be varied as desired based on a variety of factors including, without limitation, the size and diameter of the hose segments being connected, the anticipated fluid pressures and flow rates in the spliced connection, etc. However, for most subsea applications, length $L_{150}$ is preferably 0.25 to 2.0 inches (~0.6 to 5.0 cm), and more preferably 0.25 to 1.0 inches (~0.6 to 2.5 cm). Annular lip 160 is axially disposed between locking region 150 and stabbing member 120 and extends radially outward relative to stabbing member 120 and locking region 150. As best shown in FIG. 3, during subsea splicing operations, anchor members 244, 248 of clamping tool 200 are disposed about locking region 150 and axially abut lip 160, thereby restricting and/or preventing clamping tool 110 from moving axially relative to adapter 110 towards end 110b and disengaging adapter 110. Lip 160 is preferably positioned axially closer to end 110a than end 110b. For example, if the length $L_{110}$ of adapter 110 is 10 inches (~25 cm), then lip 160 may be axially positioned about 1 or 2 inches from end 110a.

Although adapter 110 includes locking region 150 and lip 160 in this embodiment, in other embodiments, the locking region (e.g., region 150) and/or the lip (e.g., lip 160) may be eliminated. For example, in embodiments where the clamping tool (e.g., clamping tool 200) does not include anchor members (e.g., anchor members 244, 248), the locking region and the lip may not be provided on the adapter.

In this embodiment, adapter 110 is monolithically formed as a unitary, single-piece structure. Further, adapter 110 is preferably made from a durable rigid material suitable for use subsea and in connection with the anticipated fluids flowing through hose segment 101. Examples of suitable materials for adapter 110 include metals and metal alloys (e.g., stainless steel, titanium alloys, inconel, aluminum if the pressure ratings are not too high, etc.), and composites (e.g., reinforced thermoplastic resins such as fiberglass). In this embodiment, adapter 110 is made from 316 stainless steel.

Figure 5:
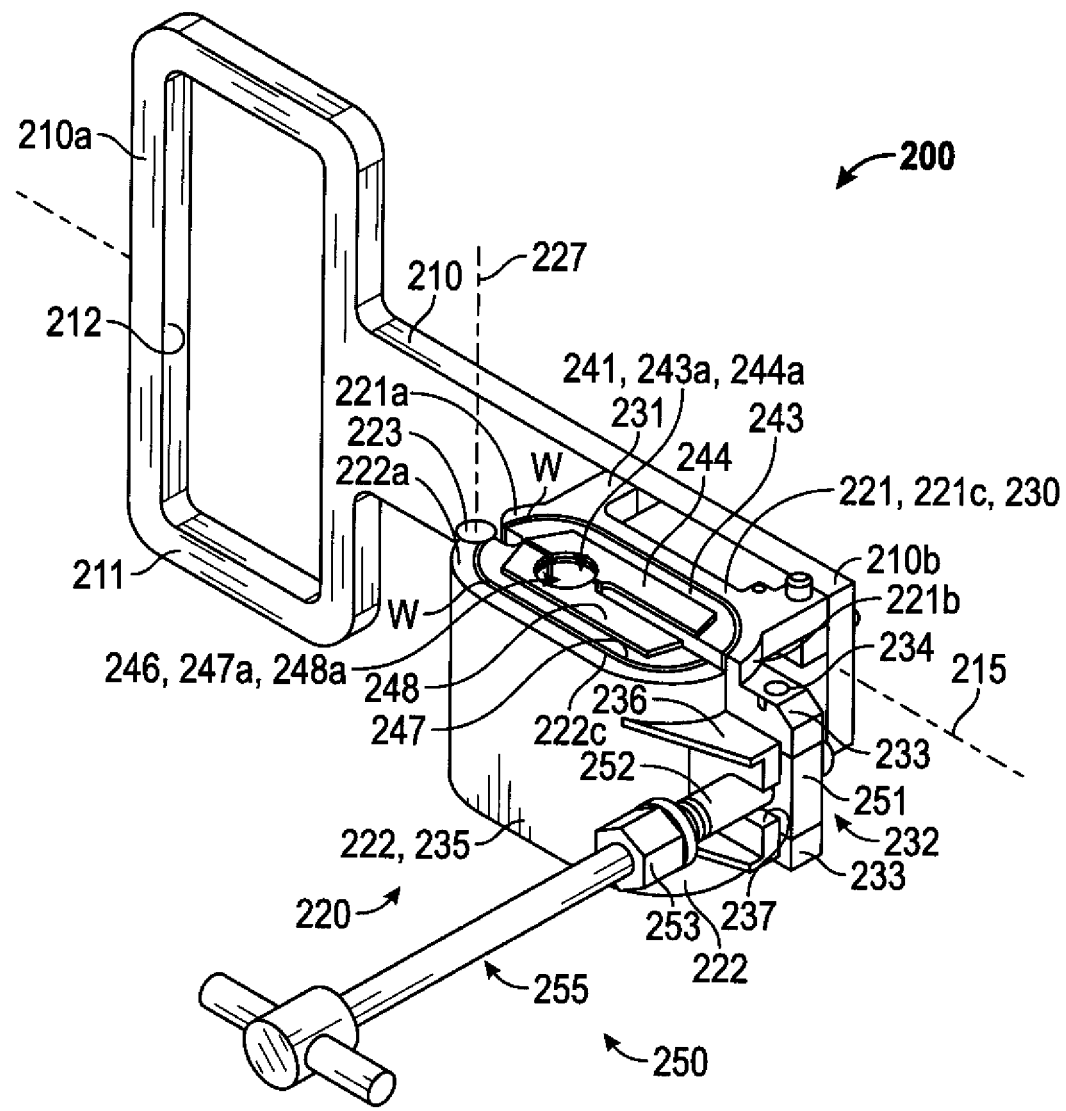
FIG. 5 is a perspective view of the hose clamping tool of FIG. 3.

Referring now to FIGS. 3 and 5, clamping tool 200 includes a base 210, a hose clamp assembly 220 coupled to base 210, and a swinging lock member 250 rotatably coupled to clamp assembly 220. As shown in FIG. 3, during subsea splicing operations, clamping tool 200 is disposed about stabbing member 120 and hose segment 101, radially compresses hose segment 101 against stabbing member 120, and maintains the position of hose segment 101 relative to adapter 110.

Referring specifically to FIG. 5, base 210 has a central or longitudinal axis 215, a first end 210a, and a second end 210b opposite end 210a. Clamp assembly 220 is mounted to end 210b, and end 210a comprises a handle 211 configured to be grasped by a subsea ROV to facilitate positioning and manipulation of tool 200. In this embodiment, base 210 is an elongate plate and handle 211 is defined by a rectangular hole 212 in end 210a. However, in general, the base (e.g., base 210) and the handle (e.g., handle 211) may have other suitable shapes and geometries. For example, the handle may comprise a T-handle, Y-handle, U-handle, a circular or oval handle, etc.

Referring again to FIGS. 3 and 5, in this embodiment, clamp assembly 220 includes a first clamp member 221 and a second clamp member 222 pivotally coupled to first clamp member 221 with a hinge 223. In particular, clamp member 221 has a first end 221a, a second end 221b opposite end 221a, and lateral sides 221c, 221d; and clamp member 222 has a first end 222a, a second end 222b opposite end 222a, and lateral sides 222c, 222d. Hinge 223 has a pivot axis 227 and is attached to ends 221a, 222a, and thus, ends 221b, 222b may be moved together and apart by pivoting first clamp member 221 relative to second clamp member 222 about axis 227. Moving ends 221b, 222b together closes clamp assembly 220, and moving ends 221b, 222b apart opens clamp assembly 220. Accordingly, clamp assembly 220 and clamp members 221, 222 may be described as having a "closed position" with ends 221b, 222b pushed together and an "open position" with ends 221b, 222b pulled apart. In FIGS. 3 and 5, clamp assembly 220 is shown in the closed position. As will be described in more detail below, lock member 250 releasably locks clamp assembly 220 in the closed position with ends 221b, 222b together. Namely, when ends 221b, 222b are locked together with lock member 250, clamp members 221, 222 are restricted and/or prevented from moving relative to each other, however, when ends 221b, 222b are not locked together with lock member 250, ends 221b, 222b are free to be transitioned between the open and closed positions.

Each clamp member 221, 222 includes an outer shell or housing 230, 235, respectively, and an insert 240, 245, respectively, disposed within housing 230, 235, respectively. Hinge 223 is attached to housings 230, 235 at ends 221a, 222a. Outer housing 230 includes a support or mounting bracket 231 that couples clamp member 221 and clamp assembly 220 to base 210. In this embodiment, mounting bracket 231 is integral with housing 230 (i.e., mounting bracket 231 and housing 230 are monolithically formed as a unitary single-piece), and is rigidly secured to base 210. In general, bracket 231 can be attached to base 210 by any means known in the art including, without limitation, welding, pins, bolts, or the like.

A yoke 232 extends from end 221b of housing 230 and includes a pair of parallel arms 233 and a pin 234 oriented parallel to pivot axis 227 extending between arms 233. In this embodiment, arms 233 are integral with housing 230 (i.e., arms 233 and outer housing 230 are monolithically formed as a unitary single-piece). As will be described in more detail below, pin 234 extends through a swivel block 251 of lock member 250, thereby allowing lock member 250 to pivot or rotate about pin 234 relative to clamp members 221, 222. A yoke 236 also extends from end 222b of outer housing 235. Yoke 236 includes an opening 237 that slidingly receives lock member 250. In this embodiment, yoke 236 is integral with outer housing 235 (i.e., yoke 236 and outer housing 235 are monolithically formed as a unitary single-piece).

Referring still to FIGS. 3 and 5, each insert 240, 245 includes a semi-cylindrical recess 241, 246, respectively, extending between the lateral sides 221c, 221d and 222c, 222d, respectively. Recesses 241, 246 are opposed one another, thereby defining a cylindrical through passage or cavity 242 extending through clamp assembly 220 when clamp members 221, 222 are in the closed position. As shown in FIG. 3, cavity 242 is configured to receive hose segment 101 and stabbing member 120 disposed therein.

In this embodiment, both recesses 241, 246 have the same semi-cylindrical geometry and size. However, in other embodiments, the recesses (e.g., recesses 241, 246) may have different geometries, sizes, or combinations thereof. In addition, although each clamp member 221, 222 comprises insert 240, 245, respectively, disposed within outer housing 230, 235, respectively, in this embodiment, in other embodiments, one or both clamp members (e.g., clamp members 121, 122) may be formed as a unitary, single-piece structure. However, clamps 221, 222 with distinct and separate inserts 240, 245, respectively, and housings 230, 235, respectively, offer potential advantages with regard to versatility as inserts 240, 245 may be replaced by different inserts to accommodate different sized hoses, as well as the ability to employ different materials to accommodate different types of hoses.

A side or spacer plate 243, 247 is coupled to lateral side 221c, 222c, respectively, of insert 240, 245, and an anchor member 244, 248 is coupled to spacer plate 243, 247, respectively. In this embodiment, plates 243, 247, 244, 248 are oriented perpendicularly to recesses 241, 246 and cavity 242. In addition, each spacer plate 243, 247 includes a semi-circular cutout 243a, 247a, respectively, that is coaxially aligned with recess 241, 246, respectively, and each anchor member 244, 248 includes a semi-circular cutout 244a, 248a, respectively, that is coaxially aligned with cutout 243a, 247a, respectively, and recess 241, 246, respectively. Cutouts 243*a*, 247*a*, 244*a*, 248*a* allow adapter 110 to extend from the end of hose segment 101 and out of clamp assembly 220 when clamp assembly 220 is in the closed position.

In this embodiment, each component of clamp tool 200 is made of a rigid, durable material suitable for subsea use. Examples of suitable materials for the components of tool 200 include, without limitation, metals and metal alloys such as stainless steel (e.g., 316-L stainless steel) and inconel. In such embodiments, each spacer plate 243, 247 can be welded to the corresponding housing 230, 235 along welds W and/or welded directly to the corresponding insert 240, 245; and anchor members 244, 248 may be welded direction to the corresponding spacer plate 243, 247.

Referring still to FIG. 3, it should be appreciated that clamp assembly 220 is mounted to adapter 110 with cutouts 243*a*, 247*a* disposed about lip 160 and cutouts 244*a*, 248*a* disposed about locking region 150. In particular, when clamp assembly 220 is in the closed position, cutouts 243*a*, 247*a* are disposed at a diameter that is substantially the same or slightly greater than the outer diameter of lip 160, and cutouts 244*a*, 248*a* are disposed at a diameter that is substantially the same or slightly greater than the outer diameter of locking region 150 and less than the outer diameter of lip 160. In addition, spacer plates 243, 247 have a thickness that is substantially the same or slightly greater than the axial thickness of lip 160. Thus, when clamp assembly 220 is closed about adapter 110, lip 160 is seated within cutouts 243*a*, 247*a* and axially positioned between anchor members 244, 248 and inserts 240, 245. This arrangement restricts and/or prevents lip 160, and hence adapter 110, from moving axially relative to clamp assembly 220 when clamp assembly 220 is locked in the closed position about hose segment 101 and adapter 110.

Referring again to FIG. 5, lock member 250 includes swivel block 251, a threaded stud 252 extending from swivel block 251, and a lock nut 253 threadably coupled to stud 252. Swivel block 251 is positioned between arms 233 and pin 234 extends therethrough. Thus, swivel block 251 is free to pivot about pin 234 relative to yoke 232 in a plane oriented perpendicular to pin 234 and base 210. When yokes 232, 236 are sufficiently close, stud 252 may be rotated into and out of opening 237.

Lock nut 253 is threaded onto stud 252 and is employed to urge clamp members 221, 222 to the closed position and lock clamp members 221, 222 in the closed position. More specifically, clamp member 221 is rotated towards clamp member 222 to bring yokes 232, 236 together, and when yokes 232, 236 are sufficiently close, stud 252 is rotated into opening 237. Then, lock nut 253 is threadably advanced along stud 252 toward yoke 236 to squeeze yokes 232, 236 together, thereby locking clamp assembly 220 in the closed position. In this embodiment, a handle 255 extends from lock nut 253 to facilitate rotation of lock nut 253 by a subsea ROV. To unlock clamping assembly 220 (so that it may be transitioned from the closed to the open position), lock nut 253 is rotated and threaded away from yoke 236 so that stud 252 can be rotated out of opening 237 to allow clamp member 221 to be rotated away from clamp member 222.

In this embodiment, handle 255 is a t-handle oriented perpendicular to the plane through which lock member 250 swings. However, in general, the handle (e.g., handle 255) may comprise any suitable type of handle capable of being manipulated with a subsea ROV such as a paddle, a plate, with an opening, a Y-handle, a U-handle, or the like.

Figure 6:
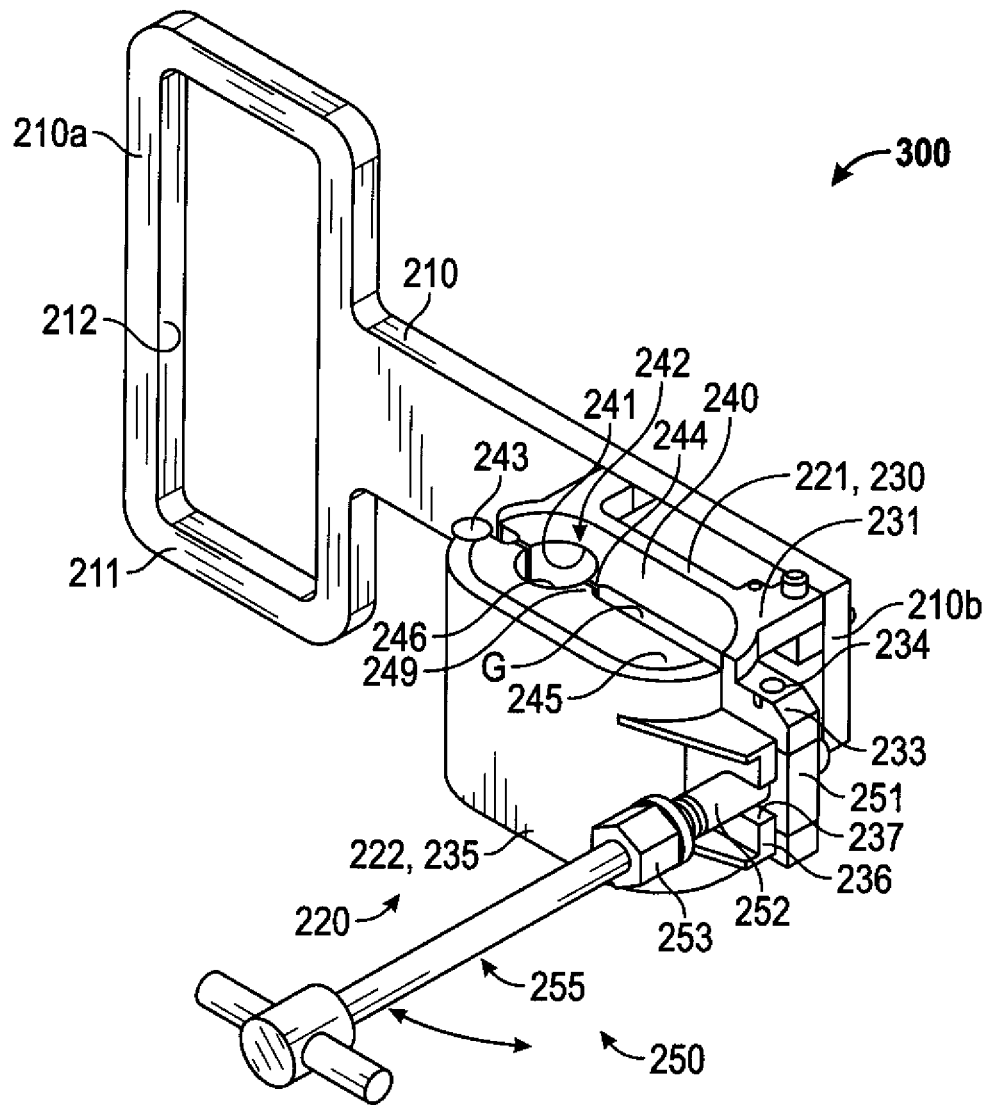
FIG. 6 is a perspective view of an embodiment of a hose clamping tool in accordance with the principles described herein that may be used in connection with the hose fitting adapter of FIG. 4 to facilitate connection of two subsea hose segments.

Referring now to FIG. 6, another embodiment of a clamping tool 300 is shown. Tool 300 is substantially the same as tool 200 previously described. Namely, tool 300 includes a base 210, a hose clamp assembly 220 coupled to base 210, and a swinging lock member 250 rotatably coupled to clamp assembly 220, each as previously described. However, in this embodiment, each insert 240, 245 is made of a resilient, durable rubber suitable for subsea use. An example of a suitable rubber for inserts 240, 245 is a nitrile rubber having a Durometer hardness of 70 Shore A, a tensile strength of at least 2400 psi (17 MPa), and an elongation 440 percent in accordance with ASTM-D2000. In addition, in this embodiment, each insert 240, 245 includes an elongate extension 244, 249, respectively, extending parallel to recesses 241, 245 between the lateral sides 221*c*, 221*d* and 222*c*, 222*d*, respectively, of the corresponding insert 240, 245. Extensions 244, 249 form a gap G between inserts 240, 245. Since inserts 240, 245 are resilient, gap G is closed as clamp members 221, 222 are urged together and locked with lock member 250, thereby creating a tight clamping action on the hose disposed within cavity 242. Still further, in this embodiment, spacer plates 243, 247 and anchor members 244, 248 are not included. However, in other embodiments, spacer plates (e.g., spacer plates 243, 247) and anchor members (e.g. anchor members 244, 248) may be used in conjunction with rubber inserts 240, 245. In particular, spacer plates can be attached to housings (e.g., housings 230, 235) such as by welding, and anchor members can be attached to the spacer plates such as by welding.

Figure 7:
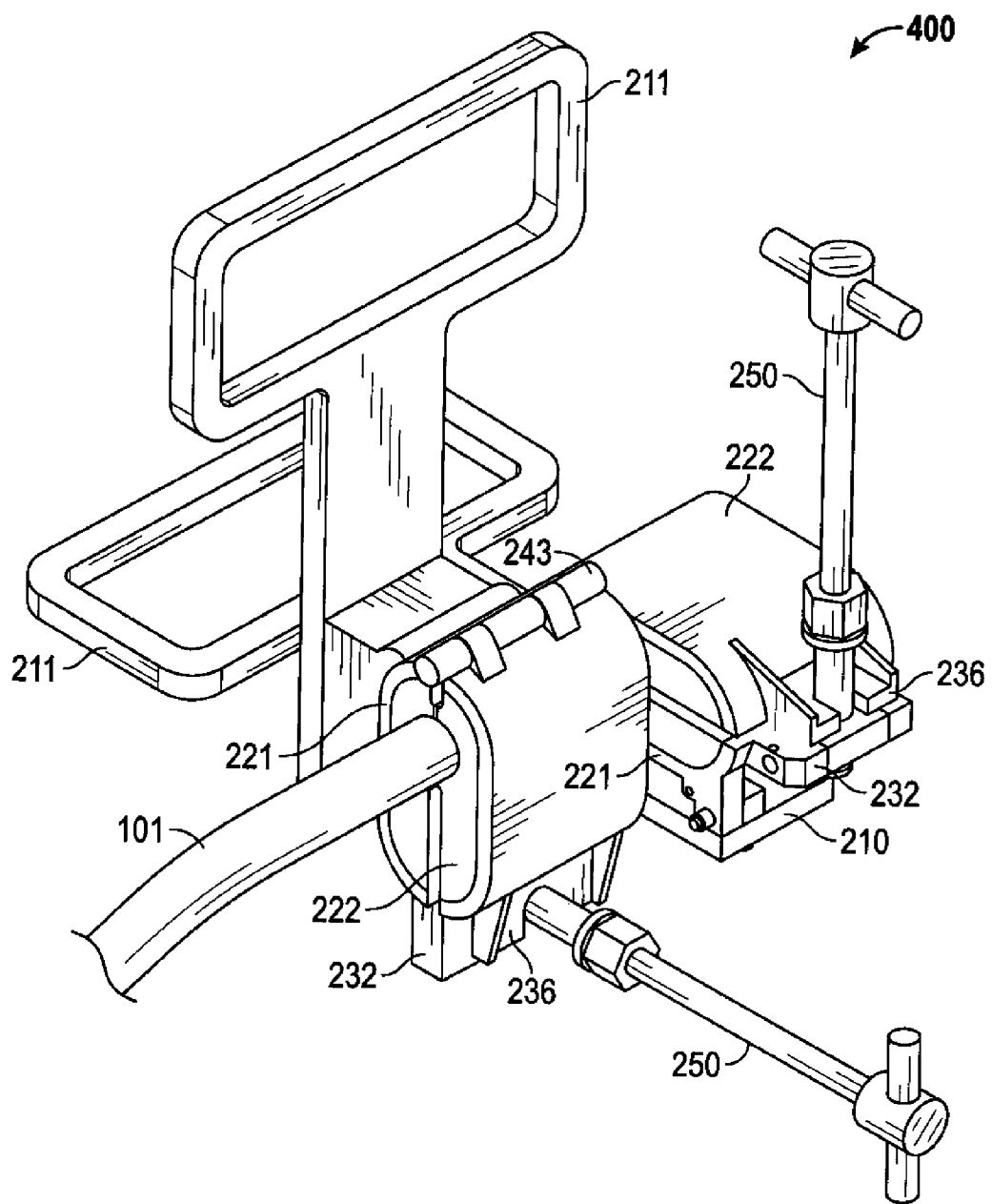
FIG. 7 is a perspective view of an embodiment of a system in accordance with the principles described herein for facilitating the connection of two subsea hose segments and including two clamping tools of FIG. 5 and one host fitting adapter of FIG. 4.

Referring now to FIG. 7, another embodiment of a system 400 to facilitate the connection of two subsea hose segments is shown. System 400 is substantially the same as system 100 previously described, except that system 400 includes a second clamping tool 200 as previously described disposed about closed, and locked onto adapter 110 and the end of hose segment 101. In particular, each clamping tool 200 compresses hose segment 101 against adapter 110 to restrict and/or prevent the end of hose segment 101 from moving relative to or disengaging clamping tools 200 and adapter 110. The arrangement shown in FIG. 7 including two clamping tools 200 offers the potential to improve reliability and securement of adapter 110 disposed within hose segment 101 (i.e., provides an increased ability to restrict and/or prevent adapter 110 from being ejected from hose segment 101) as compared to system 100 employing a single clamping tool 200.

As shown in FIG. 7, clamping tools 200 are 90° out of phase. In particular, one clamping tool 200 is rotated 90° about hose segment 101 relative to the other clamping tool 200. This orientation of clamping tools 200 offers the potential to enhance ease of implementation of clamping tools 200 with subsea ROVs. However, in general, the orientation of clamping tools 200 relative to each other may be varied as desired.

Figure 8A:
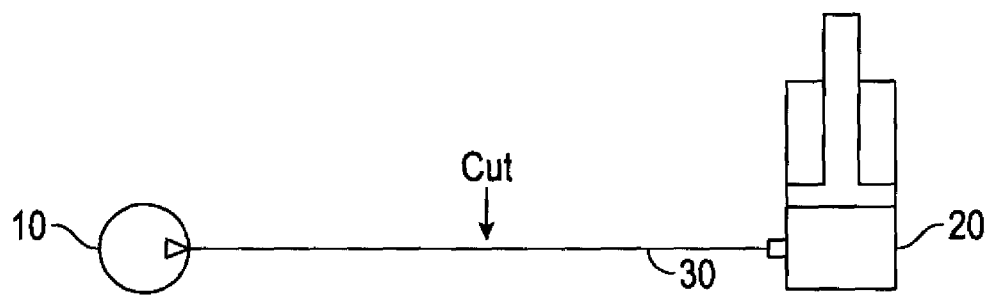
FIGS. 8A-8D are sequential schematic illustrations of an embodiment of a method for reconnecting hose segments of a subsea hydraulic power source and a subsea hydraulic system in accordance with the principles described herein.
Figure 8B:
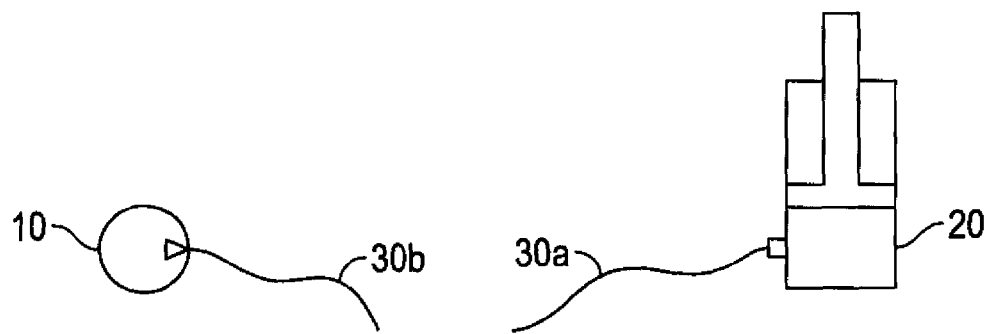

Referring now to FIGS. 8A-8D, an embodiment of a method for replacing a damaged or non-functional subsea hydraulic power source 10 with a new or repaired hydraulic power source 10' using system 100 is schematically shown. As shown in FIGS. 8A and 8B, subsea hydraulic power source 10 is disconnected from a subsea hydraulically operated system 20 by cutting the hydraulic supply hose 30 extending therebetween with a subsea ROV, leaving a first hose segment 30*a* connected to hydraulic system 20 and a second hose segment 30*b* connected to power source 10. If power source 10 is to be repaired and redeployed, it is retrieved to the surface for repair. However, if non-functional power source 10 is to be replaced, it can be retrieved to the surface or left subsea.

Figure 8C:
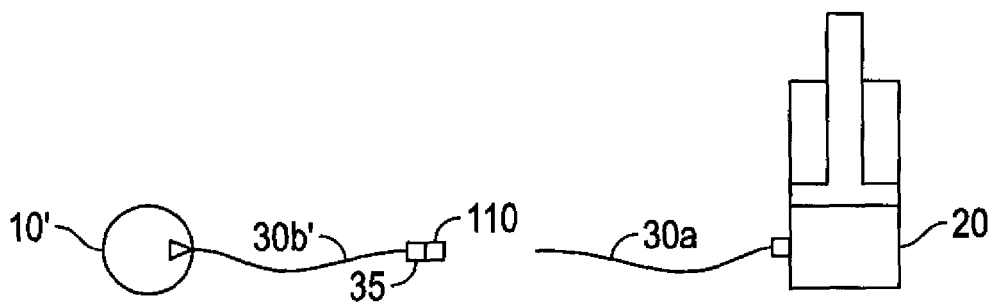

Moving now to FIG. 8C, a hose segment 30*b*' is connected at the surface to a repaired or new hydraulic power source 10', which is then lowered and installed subsea. Hose segment 30b' includes a rigid threaded hose connector or fitting 35 at its distal end. Connector 35 is configured to releasably connect to connector 130 of adapter 110. For example, connector 35 is a standard ROV female connector sized and configured to mate and releasably connect to male connector 130 of adapter 110. In this embodiment, adapter 110 is coupled to connector 35 at the surface prior to deployment of power source 10'. Thus, in this embodiment, repaired or new power source 10' is lowered and installed subsea with hose segment 30b' attached thereto, connector 35 provided at the end of hose segment 30b', and adapter 110 connected to connector 31.

Figure 8D:
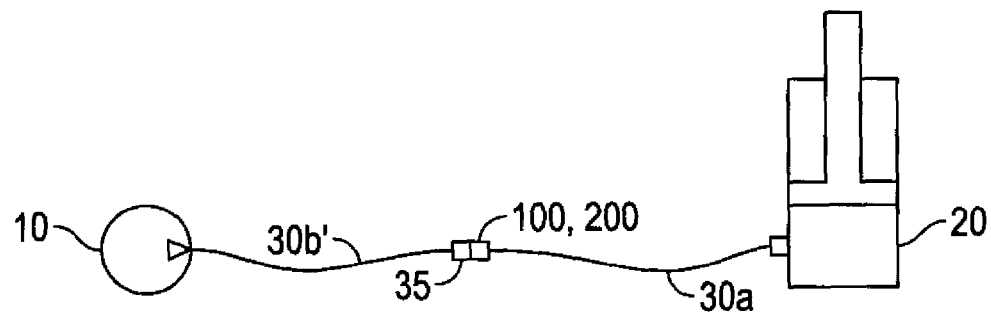

Referring now to FIG. 8D, adapter 110 is inserted into the end of hose segment 30a and clamping tool 200 is closed and locked onto the end of hose segment 30a and adapter 110 disposed therein to fluidly connect power source 10' and hydraulic system 20. More specifically, one or more subsea ROVs are employed to (a) insert and axially advance stabbing member 120 into hose segment 30a until lip 160 axially abuts the end of hose segment 30a; (b) open clamp members 221, 222 and position clamp members 221, 222 around the end of hose segment 30a and stabbing member 120 disposed therein; (c) align anchor members 244, 248 with locking region 150 and position lip 160 between inserts 240, 245; (d) transition clamp members 221, 222 to the closed position; and (e) tightened and lock clamp members 221, 222 in the closed position with lock member 250. Hydraulic power can then be supplied from power source 10' to hydraulic system 20.

In the method shown in FIGS. 8A-8D and described above, adapter 110 is coupled to hose segment 30b' at the surface via fittings 35, 130, and then following subsea installation of power source 10', adapter 110 is stabbed into the end of hose segment 30a and clamping tool 200 is closed and locked onto the end of hose segment 30a and adapter 110 disposed therein. Thus, adapter 110 is stabbed into the end of hose segment 30a and clamping tool 200 is closed and locked onto end 33 and adapter 110 disposed therein after connectors 35, 130 are connected. However, in other embodiments, adapter 110 is stabbed into the end of hose segment 30a and clamping tool 200 is closed and locked onto end 33 and adapter 110 disposed therein subsea before connectors 31, 130 are connected subsea.

Figure 1B:
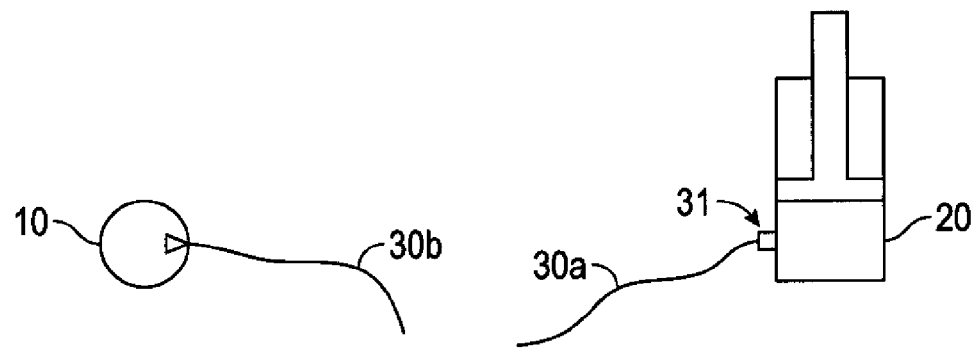
Figure 1C:
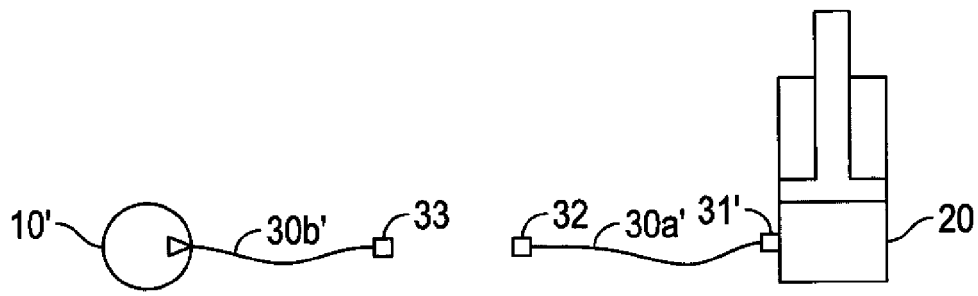
Figure 2:
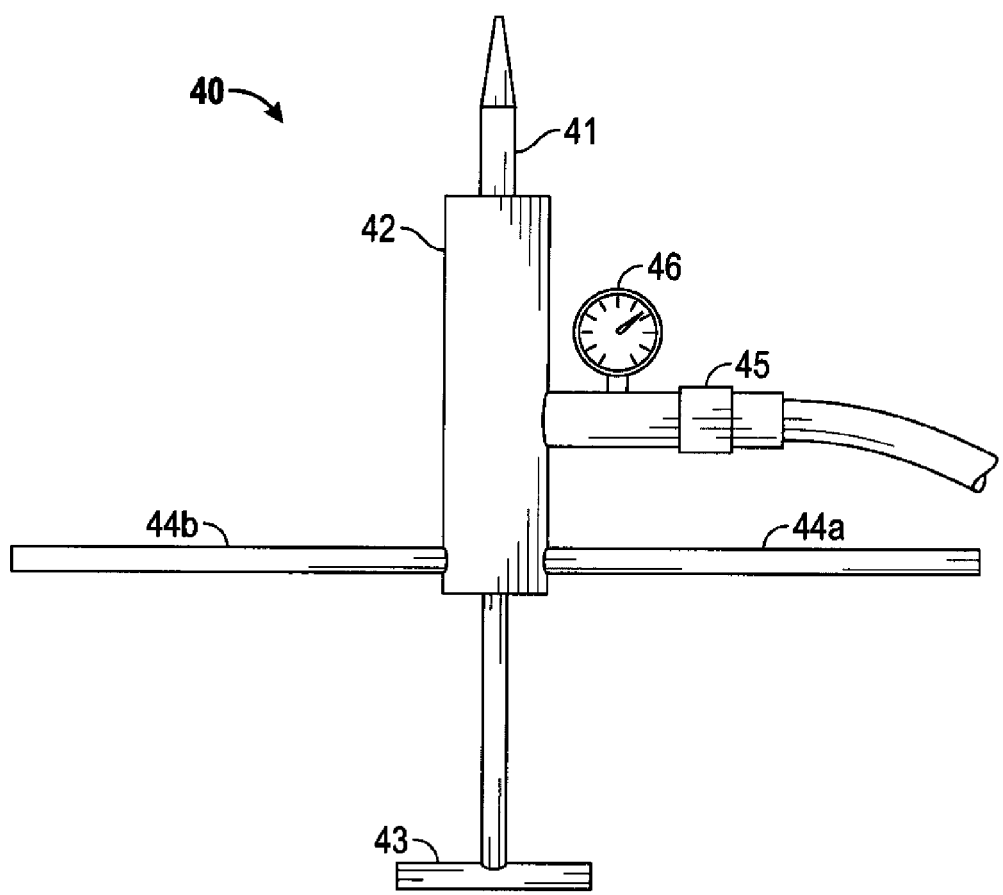
FIG. 2 is a front view of a conventional subsea hose splicing tool.

As previously described, the conventional approach to connecting subsea hydraulic hoses shown in FIGS. 1A-1C requires removal of the hose segment 30a connected to hydraulic system 20 and installation of a new hose segment 30a' onto hydraulic system 20. However, embodiments described herein eliminate these steps, thereby offering the potential for reduced down time.

In general, hydraulic system 20 may comprise any type of subsea hydraulically operated system or device. For example, system 20 may be a BOP, pump, manifold, a transfer pipeline, a lower marine riser package (LMRP), a lower riser assembly (LRA), an upper riser assembly (URA), or the like.

Figure 9:
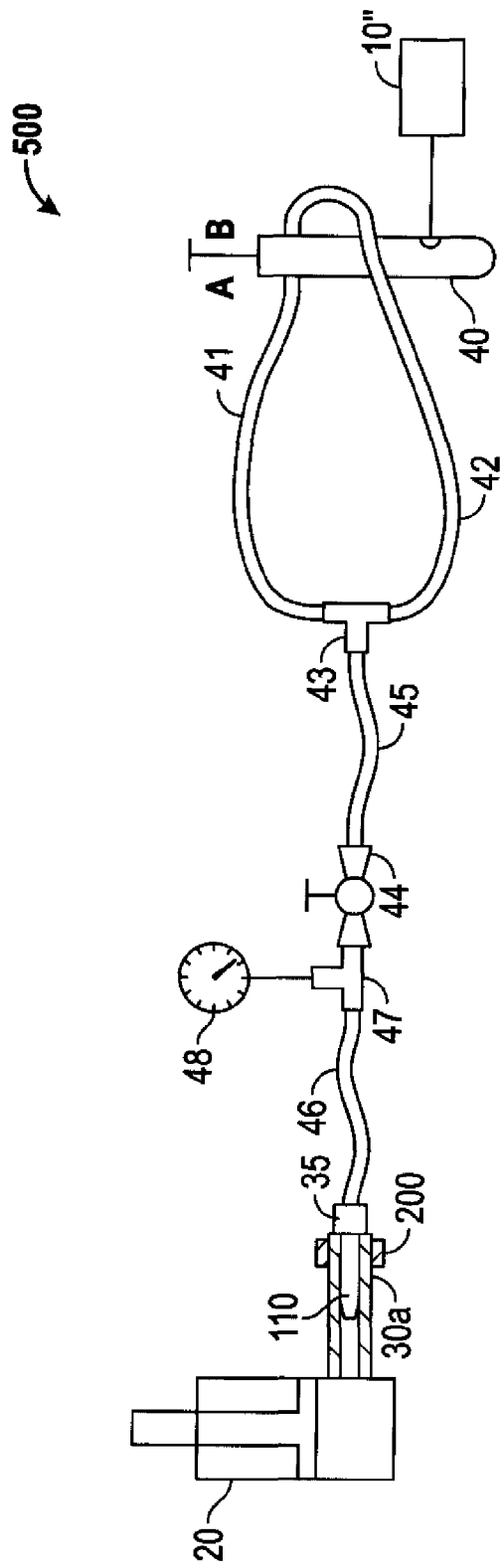
FIG. 9 is a schematic view of an embodiment of a system in accordance with the principles described herein for fluidly connecting a hydraulic power unit and a subsea hydraulic system.

Referring now to FIG. 9, a schematic illustration of an embodiment of a system 500 for fluidly connecting hydraulic system 20 to a hydraulic power unit (HPU) 10" is shown. In this embodiment, adapter 110 is stabbed into the end of hose segment 30a, and clamping tool 200 is secured around hose segment 30a and adapter 110 as previously described with respect to FIG. 8C. In addition, hydraulic power unit (HPU) 10" is fluidly connected (e.g., subsea or on a surface vessel) to an inlet of an American Petroleum Institute (API) Standard 17H hot stab 40 having outlets A and B. Hydraulic supply hoses 41, 42 are fluidly connected to outlets A, B, respectively, which in turn are fluidly connected to a tee 43. The outlet of tee 43 is fluidly connected to the inlet of a valve 44 with a hose 45. The outlet of valve 44 is fluidly connected to another hose 46 with a tee 47. One outlet of tee 84 is coupled to a pressure gauge 48, and the other outlet of tee 84 is fluidly connected with hose segment 30a and system 20 via hose 46. In particular, the end of hose 46 opposite tee 84 includes a rigid connector 35 that mates and releasably connects to connector 130 of adapter 110.

In certain methods described herein, one or more remotely operated vehicles (ROVs) are preferably employed to aid in positioning, manipulating, actuating, connecting, and disconnecting various subsea systems and components. However, the disclosure is not limited to use of ROVs, as autonomous underwater vehicles (AUVs), unmanned undersea vehicles (UUVs) manned underwater vehicles, or combinations thereof may be employed in certain embodiments. Moreover, although embodiments described herein may be used in any marine environment by human divers and/or underwater vehicles, they are particularly useful in deep and ultra-deep water environments where human diving is presently impossible.

Although embodiments of systems, devices, and methods described herein are described in the context of connecting and splicing subsea hydraulic hoses, in general, embodiments described herein may be used to splice or connect any type of hose or conduit subsea or otherwise. For example, embodiments disclosed herein may be employed to establish a new ad hoc subsea connection, repair a damaged subsea connection (e.g., a damaged umbilical extending subsea from a surface vessel to a subsea device), or replace a malfunctioning subsea hydraulic power unit.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

All U.S. published patent applications and U.S. patents referenced herein are hereby explicitly incorporated herein by reference in their entirety for all purposes. In the event definitions of terms in the referenced patents and applications conflict with how those terms are defined in the present application, the definitions for those terms that are provided herein shall be deemed controlling.

What is claimed is:
1. A subsea hose splicing system, comprising:
  a first clamping tool including:
    a first clamp member and a second clamp member, wherein each clamp member has a first end and a second end opposite the first end;
    wherein the first clamp member has an inner surface opposed to an inner surface of the second clamp member, wherein the inner surface of at least one of the first clamp member and the second clamp member includes a recess configured to receive an end of a hose;

a handle coupled to the first clamp member or the second clamp member and configured to be grasped by a subsea vehicle to manipulate the first clamping tool;

a hinge coupled to the first end of the first clamp member and the first end of the second clamp member;

a lock member pivotally coupled to the second end of the first clamp member;

a hose fitting adapter having a central axis, a first end, a second end opposite the first end, and a through bore extending axially from the first end to the second end, wherein the first end of the hose fitting adapter is configured to be inserted into the end of the hose and the second end of the hose fitting adapter comprises a connector configured to releasably connect to a rigid hose end connector;

wherein the hose fitting adapter is configured to be positioned between the first clamp member and the second clamp member of the first clamping tool.

2. The system of claim 1, wherein the inner surface of each clamp member includes a recess configured to receive the end of the hose.

3. The system of claim 2, further comprising a base having a longitudinal axis, a first end, and a second end, wherein the first clamp member is mounted to the second end of the base and the first end of the base comprises the handle.

4. The system of claim 3, wherein the base comprises a plate including an opening at the first end defining the handle.

5. The system of claim 1, wherein the lock member comprises:

a swivel block pivotally coupled to the second end of the first clamp member;

a threaded stud extending from the swivel block;

a lock nut threadably coupled to the stud; and a handle connected to the lock nut, wherein the handle of the lock member is configured to be grasped and rotated by a subsea vehicle to threadably advance the lock nut along the stud.

6. The system of claim 1, wherein the hose fitting adapter includes a stabbing member extending from the first end, wherein the stabbing member is configured to be inserted into the end of the hose, and wherein the stabbing member has an outer surface including a plurality of friction elements configured to engage and grip the hose.

7. The system of claim 6, wherein the plurality of friction elements comprise a plurality of annular ridges axially spaced along the stabbing member.

8. The system of claim 1, wherein the hose fitting adapter includes an annular locking lip axially positioned between the stabbing member and the second end, wherein the locking lip has an outer diameter greater than the outer diameter of the stabbing member.

9. The system of claim 8, wherein the hose fitting adapter includes a locking region axially positioned between the locking lip and the second end, wherein the locking region has a cylindrical outer surface.

10. The system of claim 6, wherein the stabbing member is tapered at the first end.

11. The system of claim 9, wherein the hose fitting adapter includes a gripping profile positioned axially between the locking region and the second end, wherein the gripping profile includes a plurality of circumferentially spaced planar surfaces.

12. The system of claim 1, wherein the through bore in the hose fitting adapter has an inner diameter that is substantially the same as an inner diameter of the hose.

13. The system of claim 9, wherein the first clamp member includes a first locking plate coupled to a lateral side of the first clamp member and the second clamp member includes a second locking plate coupled to a lateral side of the second clamp member, wherein the first locking plate and the second locking plate are each configured to engage the cylindrical outer surface of the locking region.

14. The system of claim 13, wherein the first locking plate and the second locking plate are configured to axially abut the locking lip.

15. The system of claim 13, wherein each locking plate includes a semi-cylindrical cutout having a radius less than an outer radius of the locking lip.

16. The system of claim 1, comprising a second clamping tool including:

a third clamp member and a fourth clamp member, wherein each clamp member has a first end and a second end opposite the first end;

wherein the third clamp member has an inner surface opposed to an inner surface of the fourth clamp member, wherein the inner surface of at least one of the first clamp member and the fourth clamp member includes a recess configured to receive the hose;

a handle coupled to the third clamp member or the fourth clamp member and configured to be grasped by a subsea vehicle to manipulate the second clamping tool;

a hinge coupled to the first end of the third clamp member and the first end of the fourth clamp member;

a lock member pivotally coupled to the second end of the third clamp member.

17. A system for connecting a first hose segment to a second hose segment, the system comprising:

a hose fitting adapter having a central axis, a first end, a second end opposite the first end, and a through bore extending axially from the first end to the second end, wherein the hose fitting adapter includes a connector at the first end, a stabbing member extending axially from the second end, an annular locking lip axially positioned between the stabbing member and the second end, and a locking region axially positioned between the locking lip and the second end;

wherein the stabbing member is disposed within an end of the first hose segment;

wherein the connector of the hose fitting adapter is configured to connect with a rigid hose connector disposed at an end of the second hose segment;

a first clamping tool disposed about the end of the first hose segment, wherein the first clamping tool includes:

a first clamp member and a second clamp member, wherein each clamp member has a first end, a second end opposite the first end, and a pair of lateral sides extending between the first end and the second end, wherein the end of the first hose segment is disposed in a cavity between the first clamp member and the second clamp member;

a hinge coupled to the first end of the first clamp member and the first end of the second clamp member;

a lock member pivotally coupled to the second end of the first clamp member, wherein the lock member compresses the first clamp member against the second clamp member;

a first locking plate coupled to one of the lateral sides of the first clamp member and a second locking plate coupled to one of the lateral sides of the second clamp member, wherein the first locking plate and the second locking plate are disposed about the locking region and axially abut the locking lip.

18. The system of claim 17, wherein the locking lip has an outer diameter greater than an outer diameter of the stabbing member, wherein the locking lip axially abuts the end of the first hose segment.

19. The system of claim 17, wherein the stabbing member has a radially outer surface that includes a plurality of friction members that engage the end of the first hose segment.

20. The system of claim 17, wherein the through bore in the hose fitting adapter has a diameter that is substantially the same as an inner diameter of the first hose segment.

21. A method for replacing a first subsea hydraulic power source connected to a subsea hydraulic system with a hydraulic hose, the method comprising:
(a) cutting the hydraulic hose into a first hose segment connected to the first subsea hydraulic power source and a second hose segment connected to the hydraulic system;
(b) deploying a second hydraulic power source subsea, wherein a third hose segment is connected to the second hydraulic power source and has a distal end coupled to a hose fitting adapter;
(c) inserting a stabbing member of the hose fitting adapter into an open end of the second hose segment using an underwater vehicle;
(d) closing a clamping tool around the open end of the second hose segment and the stabbing member disposed within the open end of the second hose segment after (c);
(e) locking the clamping tool onto the open end of the second hose segment after (d); and
(f) compressing the open end of the second hose segment between the stabbing member and the clamping tool during (e).

22. The method of claim 21, further comprising coupling the hose fitting adapter to the distal end of the third hose segment at the surface.

23. The method of claim 21, wherein the hose fitting adapter has a central axis, a first end, a second end opposite the first end, and a through bore extending axially from the first end to the second end, wherein the hose fitting adapter includes a connector at the first end, and the stabbing member extending axially from the second end.

24. The method of claim 23, further comprising releasably coupling the connector of the hose fitting adapter to a mating rigid connector on the distal end of the third hose segment at the surface.

25. The method of claim 21, further comprising:
retrieving the first subsea hydraulic power source to the surface after (a);
repairing the first subsea hydraulic power source at the surface to form the second hydraulic power source before (b).

26. The method of claim 21, wherein the second hydraulic power source is a new hydraulic power source.

27. The method of claim 21, wherein the clamping tool includes:
a first clamp member and a second clamp member, wherein each clamp member has a first end, a second end opposite the first end, and a pair of lateral sides extending between the first end and the second end, wherein the end of the first hose segment is disposed in cavity between the first clamp member and the second clamp member;
a hinge coupled to the first end of the first clamp member and the first end of the second clamp member;
a lock member pivotally coupled to the second end of the first clamp member, wherein the lock member compresses the first clamp member against the second clamp member;
a first locking plate coupled to one of the lateral sides of the first clamp member and a second locking plate coupled to one of the lateral sides of the second clamp member.

28. The method of claim 27, wherein (d) further comprises:
positioning the distal end of the third hose segment between a first recess on an inner surface of the first clamp member and a second recess on an inner surface of the second clamp member;
rotating the second end of the second clamp member relative to the second end of the first clamp member to close the clamping tool; and
engaging a locking region on the hose fitting adapter with the first locking plate and the second locking plate.

29. A method of establishing an ad hoc hydraulic power connection to a subsea hydraulic system, the method comprising:
(a) cutting a hydraulic hose extending between a first subsea hydraulic power source and the subsea hydraulic system;
(b) deploying a second hydraulic power source subsea, the second hydraulic power source fluidly connected to an assembly including a hot stab fluidly coupled to a hose fitting adapter;
(c) inserting a stabbing member of the hose fitting adapter into an open end of the hydraulic hose connected to the hydraulic system using an underwater vehicle; and
(d) securing the stabbing member within the open end of the hydraulic hose with a clamping tool disposed about the open end and the stabbing member after (c).

30. The method of claim 29, wherein (d) comprises:
(d1) closing a clamping tool around the open end of the hydraulic hose and the stabbing member disposed within the open end of the hydraulic hose;
(d2) locking the clamping tool onto the open end of the hydraulic hose; and
(d3) compressing the open end of the hydraulic hose between the stabbing member and the clamping tool during (d2).

31. The method of claim 29, further comprising coupling the hose fitting adapter to the hot stab at the surface.

* * * * *